United States Patent

[11] 3,560,784

[72] Inventors Gordon N. Steele
Santa Barbara;
Edwin J. Soxman, Golela, Calif.
[21] Appl. No. 748,046
[22] Filed July 26, 1968
[45] Patented Feb. 2, 1971
[73] Assignee Sigmatron, Inc.
a corporation of California

[54] DARK FIELD, HIGH CONTRAST LIGHT EMITTING DISPLAY
13 Claims, 5 Drawing Figs.
[52] U.S. Cl. .................................................. 313/92,
313/108, 313/112
[51] Int. Cl. ....................................................H01j 29/18,
H01j 29/28
[50] Field of Search.......................................... 313/108,
110, 112, 92 (Original) 116; 178/7.82; 250/213

[56] References Cited
UNITED STATES PATENTS
2,312,206 2/1943 Calbick ........................ 313/112X
2,616,057 10/1952 Coltman........................ 313/92
3,274,024 9/1966 Hill et al. ..................... 313/108X Primary Examiner—John Kominski
Assistant Examiner—David O'Reilly
Attorneys—Clarence A. O'Brien, Harvey B. Jacobson, D. Gordon Angus and Donald D. Mon ABSTRACT: A light-emitting phosphor display device having a high contrast ratio is provided having a light-absorbing dielectric layer on the side of the phosphor layer opposite the viewing side to absorb the incident ambient light. Polycrystalline layers with matching refractive indices are selected for the phosphor and light-abosrbing dielectric layers to reduce interface reflectance, light scattering and halation.

PATENTED FEB 2 1971 3,560,784
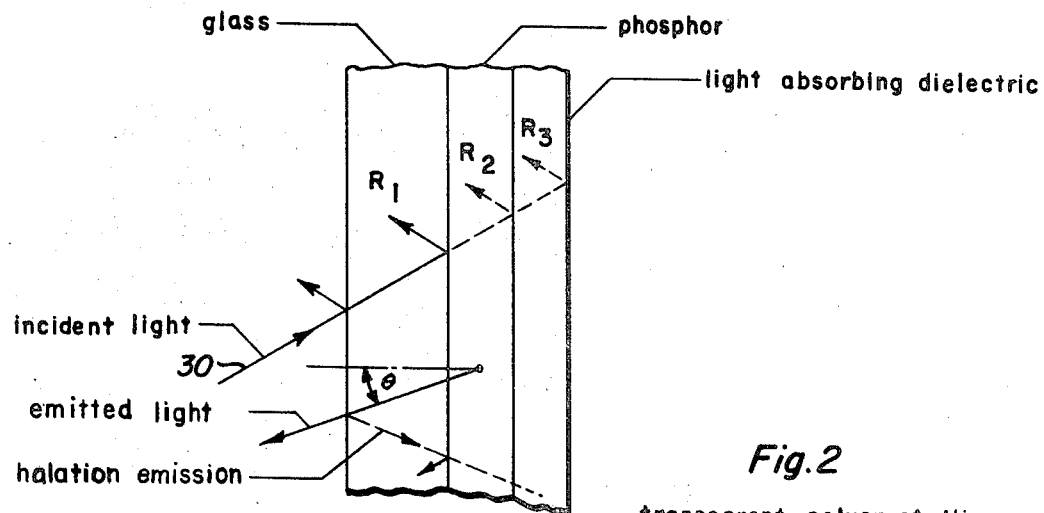
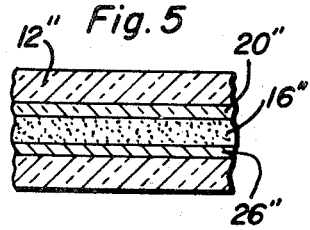
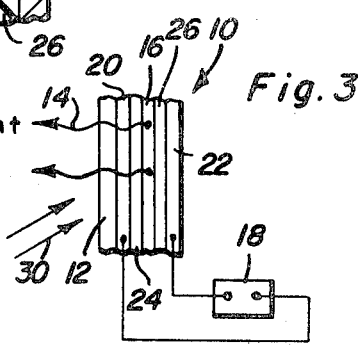
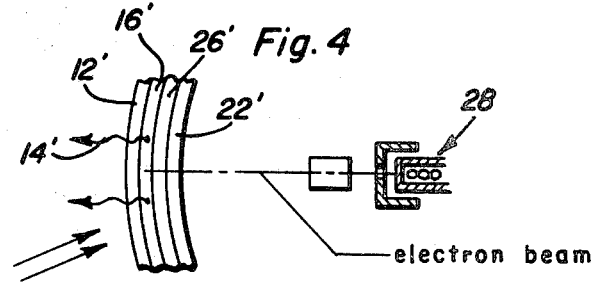
Gordon N. Steele
Edwin J. Soxman
INVENTORS

DARK FIELD, HIGH CONTRAST LIGHT EMITTING DISPLAY

This invention relates to light-emitting phosphor display devices such as electroluminescent panels, cathode ray tubes, fluorescent screens and ionized plasma devices, and more particularly to display devices having a high contrast ratio and minimal halation effects. Some parts of this invention were made in the course of work under a contract with the United States Navy.

High ambient illumination encountered in many installations, impose severe problems for light-emitting display devices. The visibility of such display devices when energized or activated, is severely degraded by spectral reflectance, diffuse and specular reflections from display surface and surrounding panels. Accordingly, considerable effort and investigation have gone into the production of electroluminescent panels and cathode ray tubes in order to overcome the aforementioned low-contrast problems.

Various solutions to the low-contrast problem have been proposed for both electroluminescent panels and cathode ray tubes. Some of these proposals include the overlay of a perforated opaque layer on the viewing side of the glass substrate or face plate of the display device in an effort to reduce surface reflectance. This solution is however unsatisfactory since it substantially restricts the viewing angle. The use of a black die in the phosphor-dielectric layer of the display device has also been proposed in an attempt to absorb incident ambient light. However, this solution is unsatisfactory since too much of the emitted light is absorbed. The use of various filters including polarizing, color and restricted angle filters have been proposed. More recently, a neutral density particle filter having low reflectance and light-absorbing characteristics has been proposed for placement between the front transparent electrode and the phosphor-dielectric layer in the case of electroluminescent panels or between the face plate and the phosphor in the case of cathode ray tubes in order to cause incident light to be doubly absorbed while light emitted from the phosphor layer suffers only a single absorption. Reflectance of ambient incident light is thereby substantially reduced with a sacrifice of phosphor-emitted light to reduce emission brightness adversely affecting the contrast ratio since emission brightness is one factor upon which contrast ratio depends.

It is therefore an important object of the present invention to provide a phosphor-emitting display device operating with a substantially high contrast ratio under high ambient illumination conditions with minimal sacrifice in emission brightness.

The goal of obtaining maximum contrast ratio for any condition of environmental illumination is achieved by a novel display device construction in accordance with the present invention which involves the use of a dark dielectric layer having light absorbing properties on the rear side of a light transmissive, phosphor layer opposite the viewing side through which incident ambient light is transmitted. Thus, the incident ambient light is substantially absorbed after passing through the phosphor layer in order to reduce or eliminate reflectance thereof. Furthermore, both the phosphor layer which is preferably polycrystalline and preferably also the dark dielectric layer are internally uniform in structure in order to reduce light scattering. Interface reflections between the layers is also reduced or minimized by design and selection of materials providing indices of refraction which are substantially close in value to each other.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a simplified diagrammatic view showing the passage of incident ambient light through a phosphor light-emitting display device.

FIG. 2 is an enlarged transverse sectional view through a display device panel constructed in accordance with the present invention.

FIG. 3 is a simplified diagrammatic view showing an electroluminescent display panel made in accordance with the present invention.

FIG. 4 is a simplified diagrammatic view of a cathode ray tube made in accordance with the present invention.

FIG. 5 is a partial sectional view through a plasma tube embodying another application of the present invention.

Referring now to the drawings in detail, FIG. 3 illustrates one form of display device generally referred to by reference numeral 10, which is of the electroluminescent type. This device includes a multilayered panel consisting of a front glass substrate 12. Emitted light designated by arrow lines 14 in FIG. 3 originates from an electroluminescent type of phosphor film 16 when excited by an electrical voltage applied to the display panel by any source of electrical energy 18 whether it be continuous DC or AC drive, scan or burst excitation. The phosphor film 16 is accordingly sandwiched between a transparent electrode 20 and an opaque electrode 22 connected across the source 18. The electrodes 20 and 22 are respectively separated from the phosphor film 16 by a transparent dielectric layer 24 and a special dark dielectric layer 26 having light absorbing properties as will be hereafter explained.

In a cathode ray tube installation as diagrammatically illustrated in FIG. 4, a special dark dielectric layer 26' may be deposited on a cathodoluminescent phosphor film 16' disposed rearwardly of the glass face plate 12'. Accordingly, energy in the form of an electron beam originating from the electron source 28 penetrates a conductive, charge dissipating layer 22' and the dark dielectric layer 26' to excite the phosphor film 16' resulting in the emission of light 14'. The properties of the layers 22' and 26' could also be combined in a single compound layer. This application of the invention to a cathodoluminescent installation is essentially the same as fluorescent screen applications except that the phosphor layer consists of a rear portion containing a phosphor excited by a beam to emit light of a short wavelength which in turn excites another phosphor in the forward portion of the layer to emit light of a visible wavelength.

FIG. 5 illustrates yet another possible application of the invention to recently developed plasma tubes. In this installation the layers are enclosed within a glass envelope 12". Light is emitted from an ionized plasma 16" disposed between a transparent electrode 20" through which the emitted light is transmitted and a black electrode 26". The electrode 26" is made of a light absorbing material so as to enhance visibility and contrast as in the case of the light-absorbing dielectric layers described in connection with the other applications.

As will be observed from the diagrams of FIGS. 3 and 4, incident ambient light 30 impinging upon the front of the display devices will affect visibility of the emitted light 14 to the observer. The degree to which the emitted light is visible by the observer, is measured as contrast ratio ($CR$). Contrast ratio is defined as $CR = L_1 - L_0/L$, where $L_1$ equals luminescence (emission plus reflectance) of an energized display segment and $L_0$ equals luminescence of background or unlit portion of display. In order to obtain a maximum contrast ratio for any condition of environmental illumination, it is desirable to obtain minimum reflectance, maximum absorption of incident light, minimum absorption of light emitted from the phosphor layer and no difference in reflectance between background and the nonenergized luminescent segment.

In accordance with the present invention, maximum absorption of incident light is obtained with absorption of only the reflected portion of the phosphor-emitted light by placing the dark dielectric layer on the rear side of the phosphor layer opposite the viewing side. With regard to the problem of reflectance of incident ambient light, this depends on several factors. These factors include the relative indices of refraction of the various layers, the thicknesses of the layers, interface boundary surfaces between the layers and the light transmission characteristics of the layers such as their light absorbing and light scattering properties. It is therefore desirable to minimize the amount of interface reflectance between the light-absorbing dielectric and the phosphor layers denoted as $R_2$ in FIG. 1. Because of the absorption of light in the light-absorbing dielectric, the amount of reflectance $R_3$ is negligible. The interface reflectance ($R_2$) may be determined from the indices of refraction of the light absorbing dielectric and phosphor layers in accordance with the following equation:

$$R_2 = \frac{(N_p - N_d)^2 + K_d^2}{(N_p + N_d)^2 + K_d^2}$$

where $N_p$ equals refraction index for phosphor, $N_d$ equals refraction index for the light absorbing dielectric and $K_d$ is the extinction coefficient for the light absorbing medium. It will be apparent from the foregoing equation that the interface reflectance ($R_2$) may be substantially reduced if the indices of refraction ($N_p$ and $N_d$) are close in value. A selection of phosphor and dielectric materials is therefore made accordingly. Furthermore, in a cathode ray tube installation the light-absorbing dielectric is made very thin or of a small atomic number material in order to permit penetration of sufficient energy to excite the phosphor layer. Also, the dielectric layer may be mildly conductive on its rear surface to provide for electrical charge dissipation.

With continued reference to the foregoing equation for reflection ($R_2$) at the dielectric interface, for each dielectric medium the refraction index $N_d - n_d + iK_d$, where $n_d$ is known as the real part of the refraction index. Since $K_d = 0$ for only transparent dielectric layers, reflection $R_2$ cannot approach zero where a light absorbing dielectric layer is involved. The light absorbing dielectric layer may accordingly be formed on the phosphor host layer by depositing a film having a real refraction index value $n_d$ and a coefficient $K_d = 0$ to match the refraction index $N_p$ of the phosphor layer with a second material having a high $K_d$ value and a high absorption characteristic introduced into the film and deposited therewith. Reflection due to the sharp dielectric interface is reduced to any desired level by control of the thickness gradient of the light absorbing material and the layer. Thus, maximum absorption may be obtained by increasing absorptivity with increased thickness of the layers.

Reflectance of light is also effected by the light scattering characteristics of the layers. In order to overcome this problem, both the phosphor layer and the light absorbing dielectric layer are dense in structure and are uniformly vacuum deposited. The dense polycrystalline structure of the phosphor layer is distinguished from the powder or particle structure of layers heretofore utilized having various dielectric binders therein. In this manner, scattering of ambient incident light internally of the phosphor layer is minimized. The dark dielectric layer being strongly light absorbing, may be either polycrystalline or amorphous in structure. Thus, the structural characteristics of the display device made in accordance with the present invention produce a high contrast ratio under all environmental light conditions.

A serious halation problem is produced by light obliquely omitted from the phosphor layer and totally reflected, from the front surface of the glass on which the phosphor layer is supported, at angles exceeding a critical value of $\theta$ as diagrammatically shown in FIG. 1. This problem is effectively eliminated through absorption of the halation emission by the light-absorbing dielectric layer disposed rearwardly of the light-emitting phosphor layer. Thus, the loss of sharpness in the light pattern boundaries because of halation effects, is minimized to enhance contrast.

A typical electroluminescent panel construction is shown in FIG. 2 in which the transparent electrode 20 made of tin oxide is disposed between the glass substrate 12 and the transparent dielectric layer 24. The light transmissive phosphor film 16 is deposited on the dielectric layer 24 to be sandwiched between the transparent electrode 20 and the opaque electrode 22. The critical light-absorbing dielectric layer 26 is disposed between the opaque electrode 22 and the phosphor film 16. Examples of materials found suitable for this dark dielectric layer are arsenic sulfide, arsenic selenide, arsenic sulfoselenide, and mixtures of the foregoing, deposited as films by evaporation in thicknesses from 1,000 angstrom units to 3 microns. This dark dielectric layer absorbs a significant percentage of the visible light which is transmitted unscattered through the phosphor film and is also characterized by a diffuse reflectance of approximately one-half of 1 percent. A typical set of materials for deposition on a cathodoluminescent phosphor such as $ZnSiO_3$ is SiO with tapered concentrates of codeposited aluminum.

We claim:

1. A cathode ray tube comprising: an evacuated envelope having a transparent viewing portion; an electron gun inside said envelope discharging toward said viewing portion; a light-transmissive, light-emitting phosphor layer on the interior surface of said viewing portion; and a light-absorbing layer covering and adherent to the phosphor layer, whereby electrons from the gun cause the phosphor layer to emit light which is transmitted through the viewing region and light transmitted toward the light-absorbing layer is substantially absorbed by the light-absorbing layer, said light-absorbing layer having an index of refraction substantially equal to that of said phosphor layer and formed to provide an intimate, contiguous and continuous transition at the interface of the phosphor layer and light-absorbing layer, whereby the substantial equality of the indices of refraction and the intimacy, contiguity and continuity of the transition at the interface of the phosphor layer and the light-absorbing layer all contribute to minimize reflection of light which impinges on the interface of the two layers from the viewing side.

2. A cathode ray tube according to claim 1 in which the light-absorbing layer is substantially transparent at the interface, and in which a gradually-increasing concentration of light-absorbing material is included as a function of the distance from said interface.

3. A cathode ray tube according to claim 2 in which the light-absorbing layer consists essentially of a silicon oxide at the interface.

4. A viewing screen for a cathode ray tube, which screen is subjected to electrons from an electron gun in an evacuated environment, said viewing screen comprising: a transparent viewing portion; a light-transmissive, light-emitting phosphor layer on the interior surface of said viewing portion intended to face the electron gun; and a light-absorbing layer covering and adherent to the phosphor layer, whereby electrons from the gun cause the phosphor layer to emit light which is transmitted through the viewing region, and light transmitted toward the light-absorbing layer is substantially absorbed by the light-absorbing layer, said light-absorbing layer having an index of refraction substantially equal to that of said phosphor layer and formed to provide an intimate, contiguous and continuous transition at the interface of the phosphor layer and light-absorbing layer, whereby the substantial equality of the indices of refraction and the intimacy, contiguity, and continuity of the transition at the interface of the phosphor layer and the light-absorbing layer all contribute to minimize reflection of light which impinges on the interface of the two layers from the viewing side.

5. A viewing screen according to claim 4 in which the light-absorbing layer is substantially transparent at the interface, and in which a gradually increasing concentration of light-absorbing material is included as a function of the distance from said interface.

6. A viewing screen according to claim 5 in which the light-absorbing layer consists essentially of a silicon oxide at the interface.

7. A viewing screen according to claim 4 in which a transparent electrode system is applied to the viewing side of the phosphor layer, and another electrode system on the opposite side of the light-absorbing layer from the viewing side.

8. A luminescent device including a light-transmissive, light-emitting phosphor layer having a viewing side and an opposite side, and a light-absorbing layer coating said opposite side, said light-absorbing layer having an index of refraction substantially equal to that of said phosphor layer and formed to provide an intimate, contiguous and continuous transition at the interface of the phosphor layer and light-absorbing layer, whereby the substantial equality of the indices of refraction and the intimacy, contiguity and continuity of the transition at the interface of the phosphor layer and the light-absorbing layer all contribute to minimize at the interface of the layers reflection of light which has passed from the phosphor layer and impinged on the interface, the light-absorbing layer being light-absorbing in the sense that it admits said light which impinges on the interface of the layers from the viewing side and absorbs it.

9. A luminescent device according to claim 8 in which the light-absorbing layer is polycrystalline.

10. A luminescent device according to claim 8 in which the light-absorbing layer is substantially transparent at the interface, and in which a gradually increasing concentration of light-absorbing material is included as a function of the distance from said interface.

11. A luminescent device according to claim 10 in which the light-absorbing layer consists essentially of a silicon oxide at the interface.

12. A luminescent device according to claim 11 in which the light-absorbing material includes aluminum.

13. A luminescent device according to claim 8 in which a transparent electrode system is applied to the viewing side of the phosphor layer, and another electrode system on the opposite side of the light-absorbing layer from the viewing side.

UNITED STATES PATENT OFFICE
CERTIFICATE OF CORRECTION

Patent No. 3,560,784       Dated February 2, 1971

Inventor(s) Gordon N. Steele and Edwin J. Soxman

It is certified that error appears in the above-identified patent and that said Letters Patent are hereby corrected as shown below:

In the Patent

Column 2, line 55
Change "$CR = L_1-L_o/L$" to --$CR = L_1-L_o/L_o$--

Column 3, line 29
Change "$N_d-n_d+iK_d$" to --$N_d=n_d+iK_d$--

Signed and sealed this 16th day of May 1972.

(SEAL)
Attest:

EDWARD M. FLETCHER, JR.
Attesting Officer

ROBERT GOTTSCHALK
Commissioner of Patent